United States Patent
Takahashi

(10) Patent No.: US 8,040,129 B2
(45) Date of Patent: Oct. 18, 2011

(54) ROTATION DETECTOR AND ROTATION DETECTOR-EQUIPPED BEARING

(75) Inventor: Toru Takahashi, Iwata (JP)

(73) Assignee: NTN Corporation, Osaka (JP)

( * ) Notice: Subject to any disclaimer, the term of this patent is extended or adjusted under 35 U.S.C. 154(b) by 259 days.

(21) Appl. No.: 12/312,251

(22) PCT Filed: Oct. 12, 2007

(86) PCT No.: PCT/JP2007/001106
§ 371 (c)(1),
(2), (4) Date: May 1, 2009

(87) PCT Pub. No.: WO2008/053581
PCT Pub. Date: May 8, 2008

(65) Prior Publication Data
US 2010/0066352 A1    Mar. 18, 2010

(30) Foreign Application Priority Data
Nov. 2, 2006  (JP) .................................. 2006-299017

(51) Int. Cl.
*G01B 7/30*    (2006.01)
(52) U.S. Cl. .................................. 324/207.25
(58) Field of Classification Search .................. None
See application file for complete search history.

(56) References Cited

U.S. PATENT DOCUMENTS
5,438,330 A    8/1995    Yamazaki et al.

FOREIGN PATENT DOCUMENTS
| JP | 3-46822 | 4/1991 |
| JP | 5-118872 | 5/1993 |
| JP | 11-337372 | 12/1999 |
| JP | 2004-37133 | 2/2004 |

OTHER PUBLICATIONS

Chinese Office Action issued Nov. 18, 2010 in corresponding Chinese Patent Application 200780039274.X.
International Search Report for International Application PCT/JP2007/001106, mailed Nov. 6, 2007.
English Translation of the International Preliminary Report on Patentability issued Jun. 4, 2009 in corresponding International Patent Application PCT/JP2007/001106.

*Primary Examiner* — Paresh Patel

(57) ABSTRACT

A rotation detecting device capable of outputting information on the absolute angle using an ABZ phase signal and without extra operation and procedures required, and a bearing assembly having this rotation detecting device incorporated therein are provided. The device includes an absolute angle detecting sensor unit for detecting the rotation angle of a rotating member as an absolute angle and a rotation pulse signal generating section for generating a rotation pulse signal including an index signal corresponding to a zero phase of the absolute angle detecting sensor unit and a pulse signal of a constant interval, based on the absolute angle detected by the absolute angle detecting sensor unit. The rotation pulse signal is outputted in an absolute angle output mode, under which the rotational pulse signal is outputted from a time the index signal is outputted to the current absolute angle.

7 Claims, 7 Drawing Sheets

PRIOR ART ced by the signal amplifying circuit and the analog-to-digital converting circuit to detect a distribution of magnetic fields emanating from the magnet 44 and, based on a result of such detection, the rotation angle of the magnet 44 is calculated by a digital signal processing circuit.

Although different from the rotation detecting device 43 disclosed in the Patent Document 1, another rotation detecting device (such as, for example, a rotary encoder commercially available under the trade name of "LSI" manufactured by AMS Corp.) is also suggested, which makes use of magnetic sensor elements such as, for example, Hall elements so that the position of a magnet, fixed to a rotary body, and the movement of such magnet can be detected by calculating respective output signals from those magnetic sensor elements.

SUMMARY OF THE INVENTION

With those known rotation detecting devices, information on the absolute angle detected can be outputted in some# ROTATION DETECTOR AND ROTATION DETECTOR-EQUIPPED BEARING

CROSS REFERENCE TO RELATED APPLICATIONS

This application claims the benefit under 35 U.S.C. Section 371, of PCT International Application No. PCT/JP2007/001106, filed Oct. 12, 2007, which claimed priority to Japanese Application No. 2006-299017, filed Nov. 2, 2006 in the Japanese Patent Office, the disclosures of which are hereby incorporated by reference.

BACKGROUND OF THE INVENTION 1. (Field of the Invention)

The present invention relates to a rotation detecting device for use in various machines and equipments, for example, a rotation detecting device for detecting the rotation angle for the purpose of controlling the rotation of, for example, a small size motor, and a detector equipped bearing assembly having such rotation detecting device incorporated therein.

2. (Description of the Prior Art)

The rotation detecting device has been suggested in, for example, the Japanese Laid-open Patent Publication No. 2004-37133, hereinafter referred to as the Patent Document 1, which is of a design capable of incorporating in a small size machine or equipment and also capable of detecting the rotation angle with high precision and which utilizes a magnetic sensor unit made up of magnetic sensor arrays. This magnetic sensor unit includes, as shown in FIG. 11 of the accompanying drawings, a plurality of magnetic sensor arrays each made up of a plurality of magnetic sensor elements (MAGFETs), which are integrated on a sensor chip 42 together with a circuit unit 46 including, for example, a signal amplifying circuit, an analog-to-digital converting circuit and a digital signal processing circuit, with the sensor chip 42 being arranged in opposition to a magnet 44 that is mounted on a rotating member 41. In this case, the magnet 44 is of a kind having an anisotropy in a circumferential direction about the axis of rotation O and, on the sensor chip 42 referred to above, the magnetic sensor arrays 45 are arranged in a square pattern, with each array occupying one of four sides of the imaginary square shape.

With the rotation detecting device 43 so constructed as hereinabove described, respective outputs from the magnetic sensor arrays 45, each positioned along one side of the imaginary square shape, are read out by the signal amplifying circuit and the analog-to-digital converting circuit to detect a distribution of magnetic fields emanating from the magnet 44 and, based on a result of such detection, the rotation angle of the magnet 44 is calculated by a digital signal processing circuit.

Although different from the rotation detecting device 43 disclosed in the Patent Document 1, another rotation detecting device (such as, for example, a rotary encoder commercially available under the trade name of "LSI" manufactured by AMS Corp.) is also suggested, which makes use of magnetic sensor elements such as, for example, Hall elements so that the position of a magnet, fixed to a rotary body, and the movement of such magnet can be detected by calculating respective output signals from those magnetic sensor elements.

SUMMARY OF THE INVENTION

With those known rotation detecting devices, information on the absolute angle detected can be outputted in some forms. For an output system of the angle information or rotation information, any suitable system such as, for example, a serial communication scheme, an analog voltage output scheme, a parallel signal transmission scheme or an ABZ phase pulse output scheme can be employed depending on the particular application for which it is desired to be used.

However, in the case of the serial communication scheme, a substantial length of time is to a certain extent required to secure the information and, therefore, it may be inconvenient in real time detection of the rotation. On the other hand, in the case of the parallel signal transmission scheme, although a high speed transmission can be achieved, there is a problem in that required wirings tend to increase. In the case of the analog voltage scheme, the accuracy of transmission of signals tends to be limited in view of noises. Yet, in the case of the ABZ phase pulse output scheme, the information on the absolute angle cannot be transmitted by the reason which will now be discussed below.

With the standard rotation detecting device of an incremental type, two pulse signals such as A and B phase pulse signals that are different in phase from each other are utilized as an output signal, but it is a general practice that by combining those two pulse signals with a Z phase signal, which is an index signal, an ABZ pulse output scheme, in which the angular position is calculated by the relative amount of change of the A and B phase signals to the Z phase signal, is generally employed as an output system.

However, in the case of this ABZ phase pulse output scheme, the position of origin of rotation cannot be ascertained so long as a rotating member is driven until the Z phase signal is outputted, and, therefore, unless any initializing operation is executed immediately after the rotation detecting device has been electrically powered on, the current angle cannot be ascertained.

An object of the present invention is to provide a rotation detecting device capable of outputting information on the absolute angle with the use of the ABZ phase signal and without extra operation or procedures and also to provide a rotation detector equipped bearing assembly having this rotation detecting device incorporated therein.

The rotation detecting device of the present invention will be described with particular reference to FIG. 1 showing a preferred embodiment thereof. This rotation detecting device includes an absolute angle detecting sensor unit 3 for detecting a rotation angle of a rotating member in the form of the absolute angle, a rotation pulse signal generating section 7 for generating a rotation pulse signal including an index signal corresponding to a zero phase of the absolute angle detecting sensor unit 3 and a pulse signal of a constant interval, based on the absolute angle detected by the absolute angle detecting sensor unit 3, and an absolute angle output mode executing section 8 for outputting the rotation pulse signal in an absolute angle output mode, under which mode the rotation pulse signal is outputted from a time the index signal has been outputted to the current absolute angle.

According to this construction, the information on the absolute angle detected by the absolute angle detecting sensor unit 3 can be outputted without extra operation and procedures required and, also, with no special hardware added, but with the use of an ABZ phase pulse signal similar to the conventional incremental encoder and, accordingly, not only can the circuit connection be achieved simply, but the cost will not increase unduly. Even on the receiving side by which such output is received, the absolute angle can be detected at all times with no need to prepare devices for exceptionally storing the absolute angle.

In the present invention, the rotation pulse signal referred to above may be made up of two pulse signals having an A phase and a B phase, respectively, which are offset 90° from each other, and the index signal.

In the present invention, the absolute angle output mode executing section 8 may be of a design capable of executing the outputting under the absolute angle output mode immediately after the absolute angle detecting sensor unit 3 has been electrically powered on and, also, in response to a request signal supplied from outside to this rotation detecting device.

In the case of this construction, when the absolute angle detecting sensor unit 3 is electrically powered on, the absolute angle output mode executing section 8 is rendered in the absolute angle output mode as a part of the initializing operation with the current absolute angle outputted consequently. Accordingly, with no need to perform the initializing operation immediately after the rotation detecting device has been electrically powered on, the current angle can be ascertained easily. Also, since in response to the request signal from the outside to the rotation detecting device, the absolute angle output mode executing section 8 executes the outputting under the absolute angle output mode, the absolute angle information can be outputted depending on the condition of the outside from which the request signal is transmitted and, therefore, it can be utilized in the form as connected with various control circuits and counting circuits.

In the present invention, a mode execution signal generating section 9 may be provided, which is operable to output a signal indicative of execution of the absolute angle output mode performed by the absolute angle output mode executing section 8. In the case of this construction, if there is provided a signal line indicative of the absolute angle output mode being operated, in an external circuit to the rotation detecting device, it is possible to determine how the rotation pulse signal, transmitted from the rotation detecting device, is outputted and, therefore, the angle information can be transmitted without disturbing controlling conditions of machines and equipments.

In the present invention, the absolute angle detecting sensor unit 3 may be a magnetic absolute angle detecting sensor unit capable of detecting magnetic fields emanating from a magnetism generating element provided in the rotating member.

In the present invention, the rotation pulse signal generating section 7 and the absolute angle output mode executing section 8 may be circuits which are integrated on the same semiconductor. In the case of this construction, the rotation detecting device of a small size, but with high precision can be realized.

A detector equipped bearing assembly of the present invention is of a type, in which the rotation detecting device of any of the foregoing constructions is incorporated in a bearing assembly.

According to this construction, not only can the number of component parts used and the number of assembling steps used be reduced, but also downsizing can be achieved.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

Figure 1:
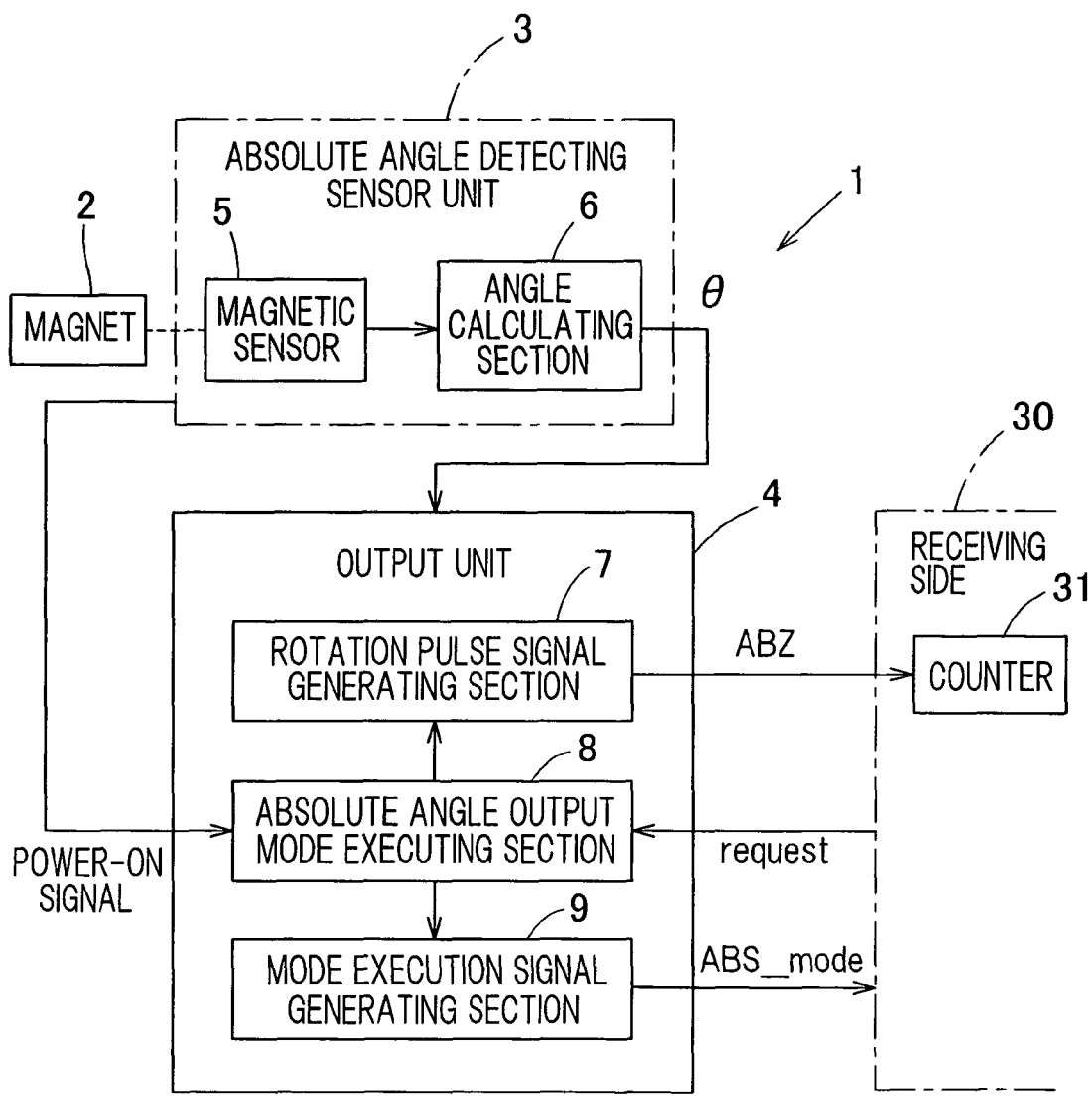
FIG. 1 is a block diagram showing a schematic construction of the rotation detecting device according to the preferred embodiment of the present invention.

The preferred embodiment of the present invention will now be described in detail with particular reference to FIGS. 1 to 3. FIG. 1 illustrates a block diagram showing a schematic construction of the rotation detecting device according to this embodiment. The rotation detecting device 1 includes a magnet 2, which is a magnetism generating element provided at a position of the rotational axis of a rotating member (not shown), an absolute angle detecting sensor unit 3 for measuring a change in magnetic field emanating from the magnet 2 to detect the rotation angle of the rotating member in the form of the absolute angle, and an output unit 4 for outputting information on the absolute angle, detected by the absolute angle detecting sensor unit 3, to a circuit 30 on the receiving side as an ABZ signal.

The magnet 2 is of a kind, in which magnetism generated from a pair of magnetic poles N and S has a directionality about the rotational axis of the rotating member, and is fixed to, for example, one end of the rotating member so that the center thereof is aligned with the rotational axis of the rotating member. When the magnet 2 rotates together with the rotating member, the magnetic poles N and S revolve about the rotational axis of the rotating member.

The absolute angle detecting sensor unit 3 includes a magnetic sensor 5 and an angle calculating section 6. The magnetic sensor 5 is capable of detecting magnetism emanating from the magnet 2 and subsequently outputting information on the rotation angle and is fixed to a stationary member (not shown) so as to confront the magnet 2 in an axial direction of the rotational axis of the rotating member. This magnetic sensor 5 is a two dimensional vector sensor or an array type sensor, in which a plurality of magnetic sensor elements (MAGEFTs) are arranged in an array.

The angle calculating section 6 measures the intensity of magnetic fields, generated by the magnet 2, from respective outputs from the magnetic sensor elements forming the magnetic sensor 5 and then detecting, as the absolute angle, the rotation angle of the rotating member based on values measured thereby.

The output unit 4 includes a rotation pulse signal generating section 7, an absolute angle output mode executing section 8 and a mode execution signal generating section 9.

The rotation pulse signal generating section 7 generates, based on the absolute angle θ detected by the absolute angle detecting sensor unit 3 referred to above, a rotation pulse signal (an ABZ phase signal) including an index signal (a Z phase signal), which corresponds a zero phase of the absolute angle detecting sensor unit 3, and a pulse signals (an AB phase signal) of a predetermined interval. In FIGS. 2, respective waveforms (A) and (B) of the two pulse signals (an A phase signal and a B phase signal) generated by the rotation pulse signal generating section 7 are shown. Those pulse signals, that is, the A phase and B phase signals are offset 90° in phase from each other. In FIG. 2, a waveform (C) of the index signal (the Z phase signal) generated by the rotation pulse signal generating section 7 is shown.

The absolute angle output mode executing section 8 outputs the rotation pulse signal (the AB phase signal) under an absolute angle output mode, in which the rotation pulse signal is outputted from a time the index signal (the Z phase signal) has been outputted, to the current absolute angle θ. The rotation pulse signal (the AB phase signal) generated by the rotation pulse signal generating section 7 under the absolute angle output mode and that generated by the rotation pulse signal generating section 7 not under the absolute angle output mode differ from each other. In other words, the rotation pulse signal (the AB phase signal) generated not under the absolute angle output mode (generated under a normal condition) is generated as a pulse signal of a speed responsive to a change of the absolute angle detected by the absolute angle detecting sensor unit 3. On the other hand, the rotation pulse signal (the AB phase signal) generated under the absolute angle output mode is generated as a pulse signal of a speed sufficiently higher than the pulse signal under the normal condition. It is to be noted that even the index signal (the Z phase signal) is rendered to be a high speed pulse signal when generated under the absolute angle output mode.

The absolute angle output mode executing section 8 is operable to execute an outputting operation under the absolute angle output mode immediately after the absolute angle detecting sensor unit 3 has been electrically powered on and in response to a request signal supplied from a circuit 30 on the receiving side which receives an output from this rotation detecting device 1. FIG. 2 illustrates a waveform (F) of the request signal outputted from the external receiving side circuit 30. The absolute angle detecting sensor unit 3 outputs an electric power-on signal immediately after it has been electrically powered on, which power-on signal is inputted to the absolute angle output mode executing section 8.

The mode execution signal generating section 9 outputs a signal (an ABS_mode signal) indicating that the absolute angle output mode executing section 8 executes the outputting operation under the absolute angle output mode. FIG. 2 illustrates a waveform (D) of the ABS_mode signal outputted by the mode execution signal generating section 9.

Figure 2:
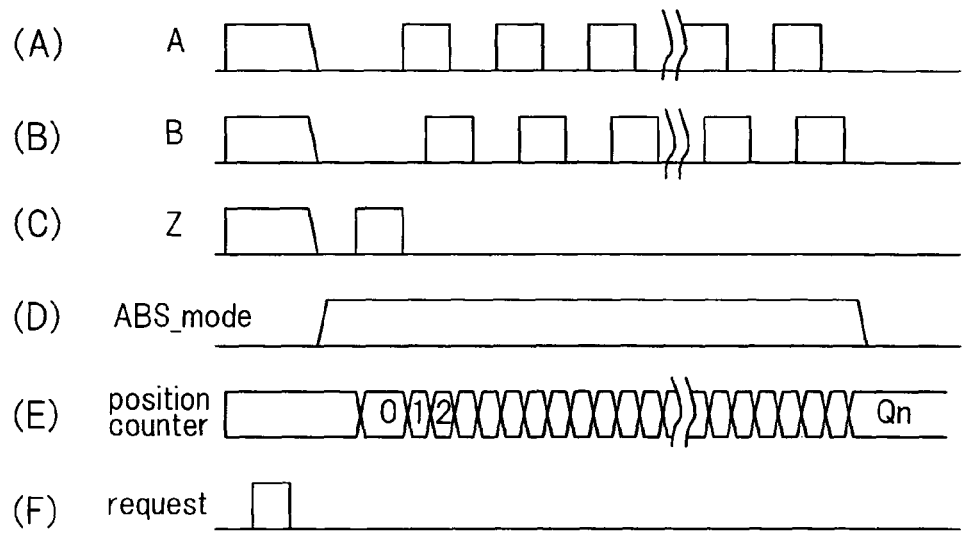
FIG. 2 is a chart showing various waveforms used to explain the operation of an output unit, used in the rotation detecting device, under an absolute angle output mode when a rotating member is held halted.

Hereinafter, the operation of the rotation detecting device 1 to detect the rotation angle of the rotating member and then to output the information on the absolute angle to the external receiving side circuit 30, which takes place when the rotating member is held halted (as shown in FIG. 2), and that which takes place when the rotating member is rotating (as shown FIG. 3) will be described individually.

When the rotating member is held halted:

When the request signal as the waveform (F) shown in FIG. 2 is supplied from the receiving side circuit 30 to the output unit 4 of the rotation detecting device 1, the absolute angle output mode executing section 8 is set in position ready to operate in response thereto, and the mode execution signal (the ABS_mode) of waveform (D) indicative of the absolute angle output mode being activated as shown in FIG. 2 is generated from the mode execution signal generating section 9. On the other hand, rotation pulse signals (A, B and Z) as waveforms (A), (B) and (C) shown in FIG. 2, respectively, are generated from the rotation pulse signal generating section 7. The sequence of generation of those signal is such that the ABS_mode signal is first set to 1, the index signal (the Z phase signal) is subsequently outputted and thereafter the two rotation pulse signals (the A phase signal and the B phase signal) are outputted. The index signal (the Z phase signal) in this case is outputted regardless of the zero phase of the absolute angle detecting sensor unit 3.

In the receiving side circuit 30 which operates in response to those signals, a position counter 31 for indicating the value of the absolute angle is reset to zero in response to receipt of the index signal (the Z phase signal). This position counter 31 counts the A phase signal and the B phase signal, which are outputted following the Z phase signal, in a manner as shown in pattern (E) in FIG. 2. Processing of the A phase signal and the B phase signal by the position counter 31 is to count (four times multiplication) each of those signals at an edge portion. Assuming that the absolute value of the current rotation angle detected by the rotation detecting device 1 is expressed by Qn, the rotation pulse signal generating section 7 outputs pulses as the A phase signal and the B phase signal in total number equal to Qn, which is the count value counted by the position counter 31.

Also, when the rotation pulse signal generating section 7 outputs the pulses as the A phase signal and the B phase signal corresponding to the total Qn count value, the ABS_mode signal generated by the mode execution signal generating section 9 is set to zero, with the absolute angle output mode terminated consequently. As a result, the count value of the position counter 31 in the receiving side circuit 30 indicates the absolute value Qn of the current rotation angle outputted from the rotation detecting device 1 upon termination of the absolute angle output mode.

Accordingly, when the A phase signal and the B phase signal outputted from the rotation pulse signal generating section 7 during the absolute angle output mode (the ABS_mode=1) are counted, the absolute angle data Qn are transferred to the position counter 31 in the receiving side circuit 30 and, therefore, with no need to use an extra serial communication device, information on the absolute angle can be outputted towards the receiving side circuit 30 by the utilization of the ABZ phase signal.

Although in the foregoing description the absolute angle output mode executing section 8 has been described as set under the absolute angle output mode when the request signal for the absolute angle output mode is inputted to output unit 4 from the receiving side circuit 30, the absolute angle output mode executing section 8 is also set under the absolute angle output mode as a part of the initializing operation even when the absolute angle detecting sensor unit 3 of the rotation angle detecting device 1 is electrically powered on. In such case, the electric power-on signal outputted from the absolute angle detecting sensor unit 3 will serve as a timing signal for the absolute angle output mode in place of the request signal.

Even in this case, since when the absolute angle detecting sensor unit 3 is electrically powered on, the AB phase signal representative of the number of the pulses, which corresponds to the current absolute angle detected by the absolute angle detecting sensor unit 3 is outputted, the current absolute angle is transmitted to the receiving side circuit 30, which receives this signal. Where the receiving side circuit 30 is reset or where the receiving side circuit 30 requires a substantial length of time for it to be driven and the AB phase signal therefore is not received accurately immediately after the supply of an electric power to the absolute angle detecting sensor unit 3 has been switched on, the current absolute angle can be transferred to the receiving side circuit 30 when the request signal is again inputted to the output unit 4 of the rotation angle detecting device 1 so as to execute the absolute angle detecting mode.

It is to be noted that during the absolute angle output mode the A, B and Z phase signals referred to above are outputted in the form of a pulse signal of a speed as high as possible. As a result thereof, the length of time required for the absolute angle information to be transferred to the receiving side circuit 30 can be minimized.

Figure 3:
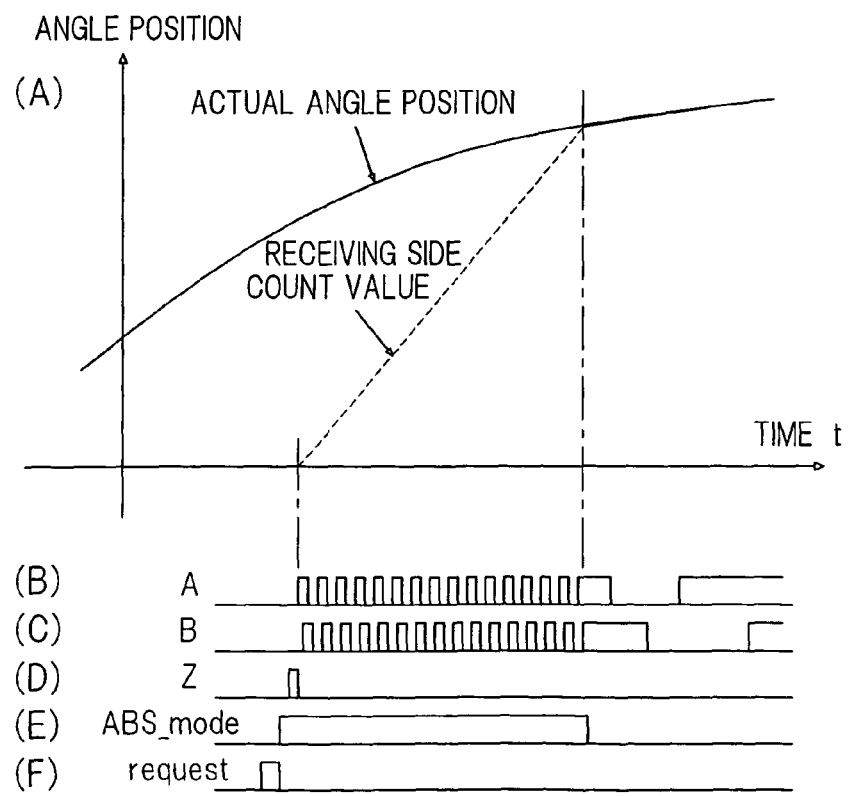
FIG. 3 is a chart showing various waveforms used to explain the operation of the output unit in the rotation detecting device under the absolute angle mode when the rotating member is rotated.

When the rotating member is driven, i.e., rotating:

Even in this case, when the request signal as waveform (F) shown in FIG. 3 to output the absolute angle is supplied from the receiving side circuit 30 to the output unit 4 of the rotation detecting device 1, the absolute angle output mode executing section 8 is set in position ready to operate in response thereto and the mode execution signal (the ABS_mode=1) indicative of the absolute angle output mode of pattern (E) being activated as shown in FIG. 3 is generated from the mode execution signal generating section 9. On the other hand, rotation pulse signals (A, B and Z phase signals) as waveforms (B), (C) and (D) shown in FIG. 2, respectively, are generated from the rotation pulse signal generating section 7.

In the receiving side circuit 30, the position counter 31 for indicating the value of the absolute angle is reset to zero in response to receipt of the Z phase signal. This position counter 31 counts the A phase signal and the B phase signal, which are outputted following the Z phase signal. When the pulse signals of the A phase signal and the B phase signal once attain the value of the current absolute angle as shown in Chart (A) of FIG. 3, the operation under the absolute angle output mode then terminates (ABS_mode=0). Thereafter, a rotation pulse signal (an ABZ phase signal) corresponding to change in absolute angle incident to rotation of the rotating member detected by the absolute angle detecting sensor unit 3 is outputted. In this way, in the receiving side circuit 30, which recognizes the absolute angle by counting the pulses, a condition is established in which the actual absolute angle information is acquired at all time subsequent to the termination (ABS_mode=0) of the operation under the absolute angle output mode.

As hereinabove described, in the rotation detecting device 1 according to the present invention, the absolute angle information detected by the absolute angle detecting sensor unit 3 can be outputted with no need to additionally use any special hardware, but with the utilization of the ABZ phase pulse signal similar to the conventional incremental encoder and, therefore, a simple circuit connection can be accomplished with minimized cost. Even on the receiving side which receives such output, the absolute angle and the absolute angle can be detected at all times with no need for any special devices such as, for example, a device for storing.

Also, in the embodiment of the present invention described hereinabove, the mode execution signal generating section 9 is employed, which outputs the signal (ABS_mode) indicating that the absolute angle output mode is executed by the absolute angle output mode executing section 8 of the output unit 4. Therefore, where a signal line is provided for to show that the operation is taking place under the absolute angle output mode, it is possible for the receiving side circuit 30 to determine the condition in which the rotation pulse signal (the ABZ phase signal) fed from the rotation detecting device 1 is outputted and, hence, the angle information can be transmitted without the condition of control of machines and equipments being disturbed. By way of example, even where the receiving side circuit 30 executes a motor control, it is possible to avoid an abnormal operation from occurring therein.

In addition, since in the embodiment of the present invention hereinabove described, the absolute angle output mode executing section 9 executes outputting under the absolute angle output mode in response to the request signal inputted from the outside (the receiving side circuit 30) to the rotation detecting device 1, the absolute angle information can be outputted depending on the condition of the receiving side circuit 30 and can be utilized with it being connected with various control circuits and/or counting circuits.

Figure 4:
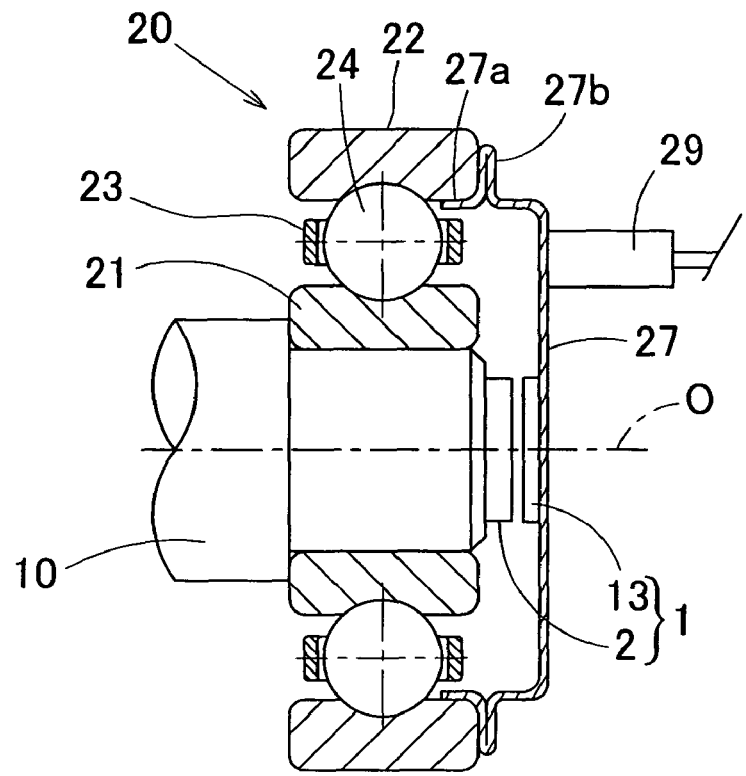
FIG. 4 is a sectional view of a rotation detector equipped bearing assembly having a rotation detecting device, equivalent to the rotation detecting device, incorporated therein.
Figure 5:
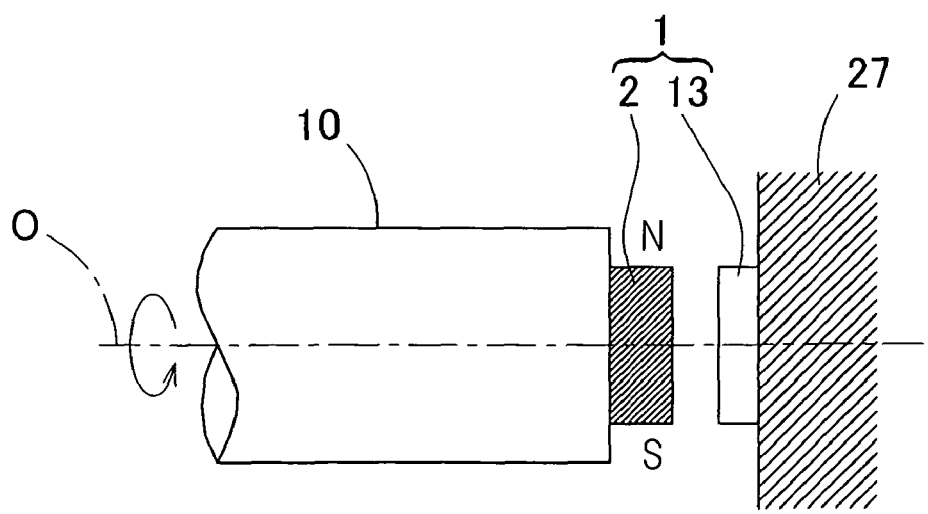
FIG. 5 is an enlarged side view showing a rotation detecting device mounting area in the bearing assembly.

FIG. 4 illustrates a sectional view of a bearing assembly, into which a rotation detecting device substantially equivalent to that according to the embodiment of the present invention is incorporated. This rotation detector equipped bearing assembly 20 is a rolling bearing assembly of a type, in which rolling elements 24 are retained by a retainer 23 and are interposed between respective raceways of inner ring 21 and an outer ring 22. The rolling elements 24 are in the form of balls and this rolling bearing assembly 20 is in the form of a single row deep groove ball bearing. A rotary shaft 10, which is a rotating member, is inserted having been press-fitted in the inner ring 21 and the outer ring 22 is installed in a housing (not shown) for a machine or equipment in which a bearing is utilized.

The rotation detecting device 1 that is incorporated in the rolling bearing assembly 20 includes a magnet 2 arranged on the side of the inner ring 21 of the rolling bearing assembly 20 and a rotation sensor 13 arranged on the side of the outer ring 22. More specifically, the permanent magnet 2 having a pair of magnetic poles N and S formed therein is arranged on the rotary shaft 10 rotatable together with the inner ring 21, and the rotation sensor 13 is arranged on a sensor mounting member 27 fixed to the outer ring 22.

The magnet 2 is of a type, in which magnetism emanating from the pair of the magnetic poles N and S has a directionality about a rotational axis O of the rolling bearing assembly 20, that is, the intensity of magnetic fields changes in a circumferential direction. As a result, when the magnet 2 rotates, the magnetic field at a fixed point located outside the magnet 2 changes at a cycle proportional to the speed of rotation. This magnet 2 is fixed at a center of one end of the rotary shaft 10 so that the rotational axis O of the rolling bearing assembly 20 aligns with the center of the magnet 2. When the magnet 2 rotates together with the rotary shaft 10, the magnetic poles N and S revolve about the rotational axis O, that is, the longitudinal axis of the bearing assembly referred to above.

The rotation sensor 13 is a sensor for detecting the magnetism emanating from the magnet 2 and then outputting information on the rotation angle. This rotation sensor 13 is fitted on the side of the outer ring 22 through the sensor mounting member 27 so as to confront the magnet 2 in an axial direction of the rotational axis O of the rolling bearing assembly 20. More specifically, the sensor mounting member 27 referred to above is fitted to the outer ring 22, and the rotation sensor 13 is fixed to this sensor mounting member 27. The sensor mounting member 27 has a free end cylindrical portion 27a, defined at an outer periphery thereof, and a collar 27b formed in the vicinity of the free end cylindrical portion 27a and is axially positioned with the free end cylindrical portion 27a fitted on an inner diametric surface of the outer ring 22 and with the collar 27b engaged with an end face of the outer ring 22. Also, the sensor mounting member 27 has an outer cable 29 fitted thereto so that an output from the rotation sensor 13 can be drawn therethrough to the outside.

Figure 6:
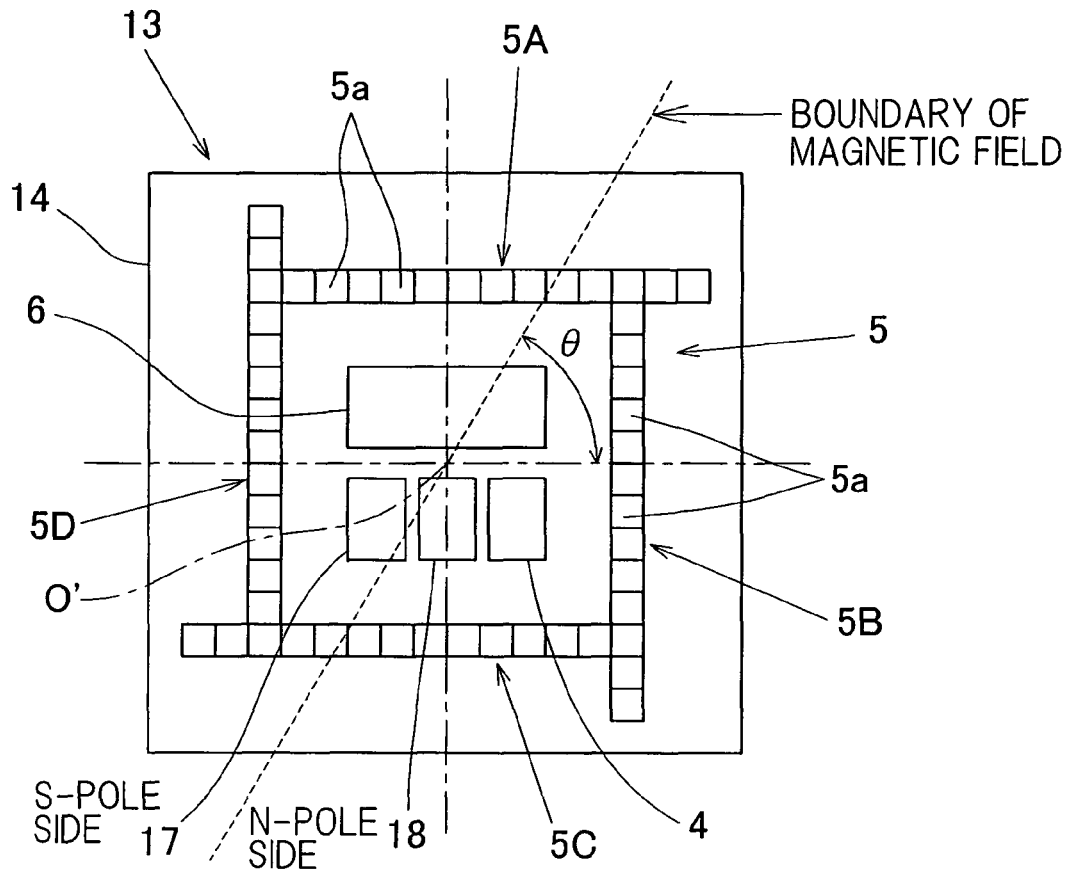
FIG. 6 is a plan view showing a semiconductor chip forming one example of a rotation sensor employed in the bearing assembly.

As shown in a top plan view in FIG. 6, the rotation sensor 13 is formed by integrating a large size integrated circuit (LSI) on a single semiconductor chip 14. This large size integrated circuit includes a plurality of magnetic sensor elements 5a forming the magnetic sensor 5, an angle calculating section 6 for measuring from an output of the magnetic sensor elements 5a, the intensity of magnetic fields emanating from the magnet 2 to thereby detect the rotation angle of the rotary shaft 10, which is a rotating member, in the form of the absolute angle on the basis of a value so measured, a delay time correcting section 17, an interpolation section 18 and an output unit 4. In the instance as shown, the magnetic sensor 5, the angle calculating section 6, the delay time correcting section 17 and the interpolation section 18 altogether form the absolute angle detecting sensor unit 3 shown in FIG. 1, and this absolute angle detecting sensor unit 3 and the output unit 4 are integrated together on the semiconductor chip 14 to thereby define the rotation sensor 13. It is, however, to be noted that the output unit 4 may be installed at a location separate from the semiconductor chip 14.

On the semiconductor chip 14, the magnetic sensor elements 5a are arranged in a square pattern, with each of four sides of the imaginary square shape occupied by magnetic sensor arrays 5A to 5D that is made up of the magnetic sensor elements 5a. In this case, the geometric center O' of the imaginary square shape aligns with the rotational axis O of the rolling bearing assembly 20. Although in the instance as shown and now under discussion each of the magnetic sensor arrays 5A to 5D is shown and described as including the sensor elements 5a arranged in one row, the sensor elements 5 may be lines up in a plurality of rows. A calculating circuitry made up of the angle calculating section 6, the delay time correcting section 17, the interpolation section 18 and the output unit 4 is positioned inside the square pattern of arrangement of the magnetic sensor arrays 5A to 5D. The semiconductor chip 14 is fixed to the sensor mounting member 27 so as to have its element forming surface confronting the magnet 2.

Figure 7:
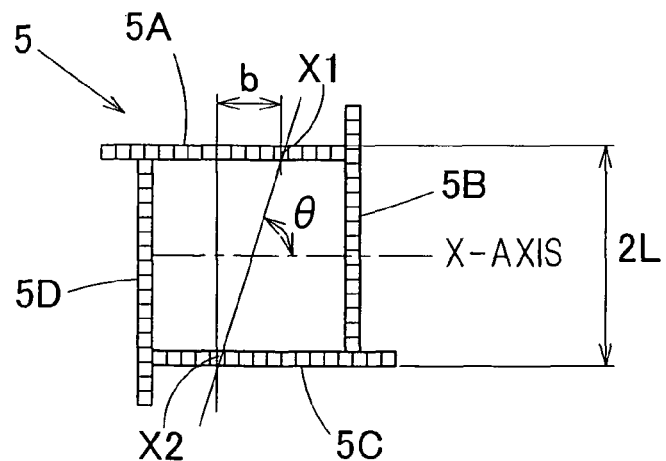
FIG. 7 is an explanatory diagram showing an angle calculating process performed by an angle calculating section used in the rotation sensor.
Figure 8:
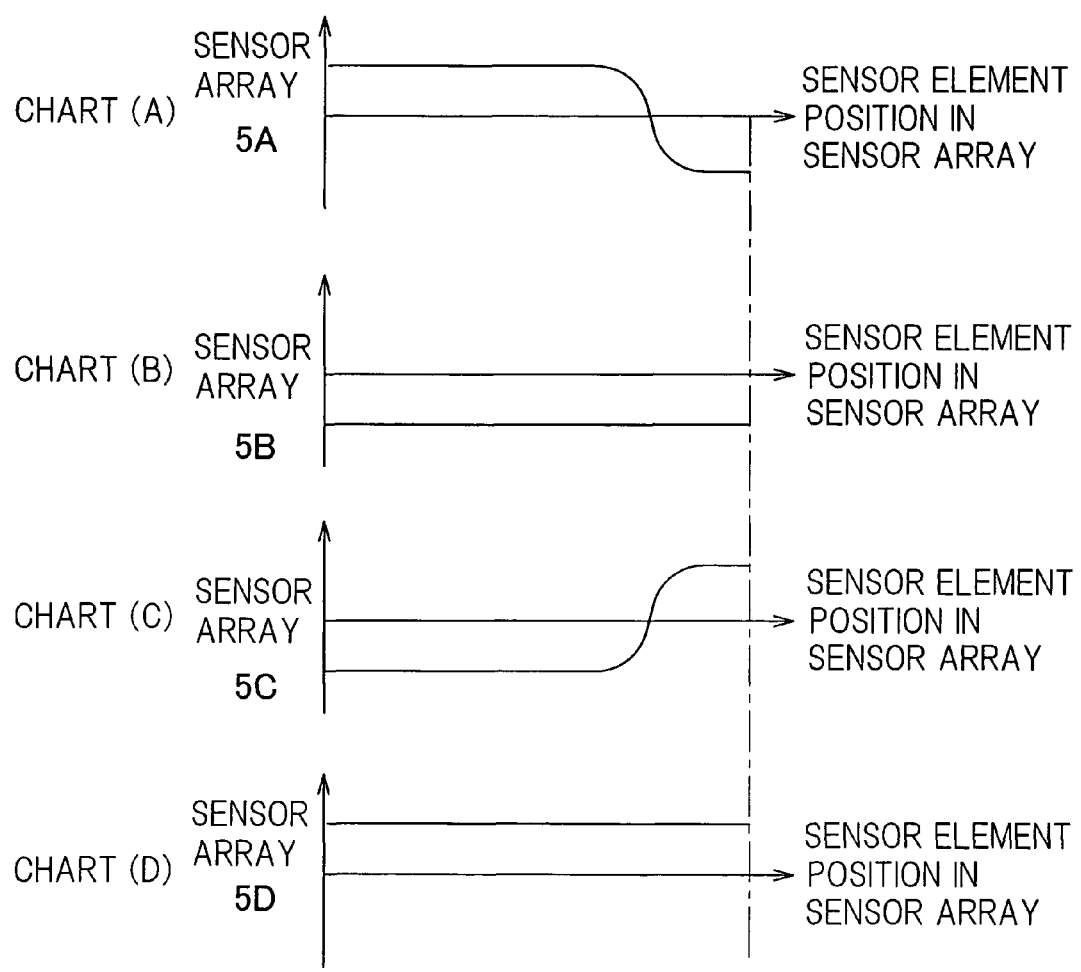
FIG. 8 is a chart showing various waveforms of outputs from magnetic sensor arrays used in the rotation sensor.

FIGS. 7 and 8 illustrate explanatory diagrams of a rotation angle calculating process performed by the angle calculating section 6. Charts (A) to (D) in FIG. 8 illustrate respective output waveforms of the magnetic sensor arrays 5A to 5D when the rotary shaft 10 undergoes rotation, in which the axis of abscissas represents the magnetic sensor elements 5a in each of the magnetic sensor arrays 5A to 5D and the axis of ordinates represents the intensity of magnetic fields detected.

Let it be assumed that the zero crossing position, which is the boundary between the magnetic poles N and S of the detected magnetic fields of the magnetic sensor arrays 5A to 5D, lies at positions X1 and X2 shown in FIG. 7. Under this condition, outputs from the magnetic sensor arrays 5A to 5D are represented by signal waveforms shown in Charts (A) to (D) of FIG. 8, respectively. Accordingly, the zero crossing positions X1 and X2 can be calculated by means of collinear approximation from the respective outputs of the magnetic sensor arrays 5A and 5C.

The angle calculation can be carried out by the following equation (1):

$$\theta = \tan^{-1}(2L/b) \quad (1)$$

where $\theta$ represents the value of the rotation angle of the magnet 2 expressed in the form of the absolute angle, 2L represents the length of each of the four sides of the imaginary rectangular shape occupied by the respective magnetic sensor arrays 5A to 5D, and b represents the transverse distance between the zero crossing positions X1 and X2.

Where the zero crossing positions X1 and X2 lie on the magnetic sensor arrays 5B and 5D, respectively, the rotation angle $\theta$ can be calculated in a manner similar to that described above, in reference to data on the zero crossing positions that are obtained from respective outputs of the magnetic sensor arrays 5B and 5D.

Figure 10:
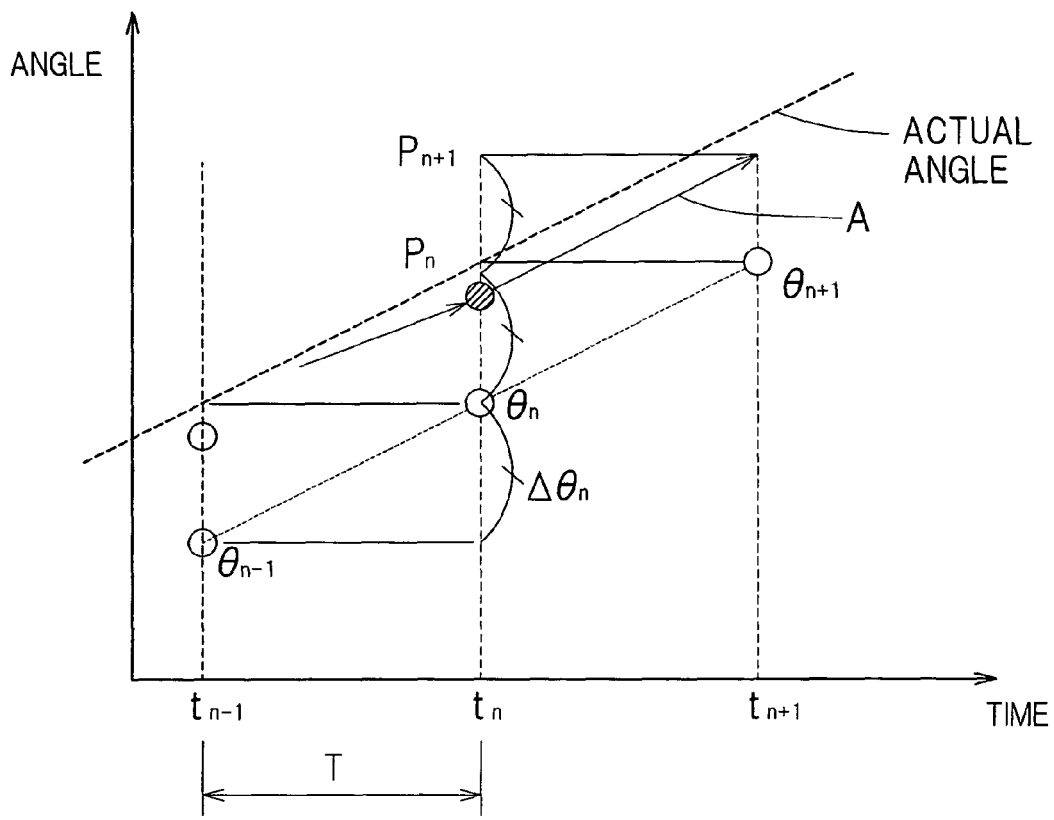
FIG. 10 is an explanatory diagram showing a processing operation of a delay time correcting section employed in the rotation detecting device.
Figure 11:
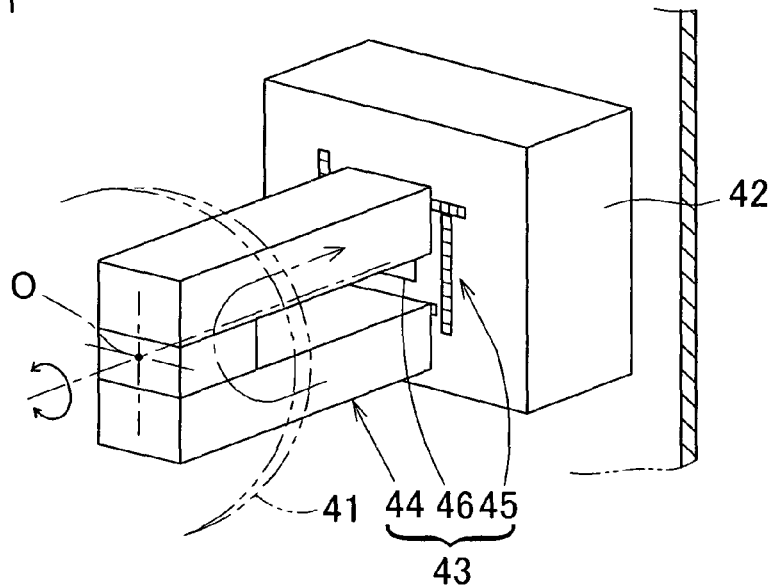
FIG. 11 is a perspective view showing the conventional rotation detecting device.

In the meantime, a delay in time occurs during a period after the angle calculating section 6 has performed the calculation in the manner described above and before the rotational angle $\theta$ is outputted. Accordingly, it may occur that the position of the rotational angle detected during a high speed rotating condition differs from the actual position of the rotational angle. FIG. 10 illustrates relations between the actual angle and the detected angles $\theta n-1$, $\theta n$ and $\theta n+1$, which are calculated and outputted from the angle calculating section 6 at respective timings tn−1, to and tn+1. The difference between each of the detected angles $\theta n-1$, $\theta n$ and $\theta+1$ and the actual angle is that attributable to the time delay referred to above.

Figure 9:
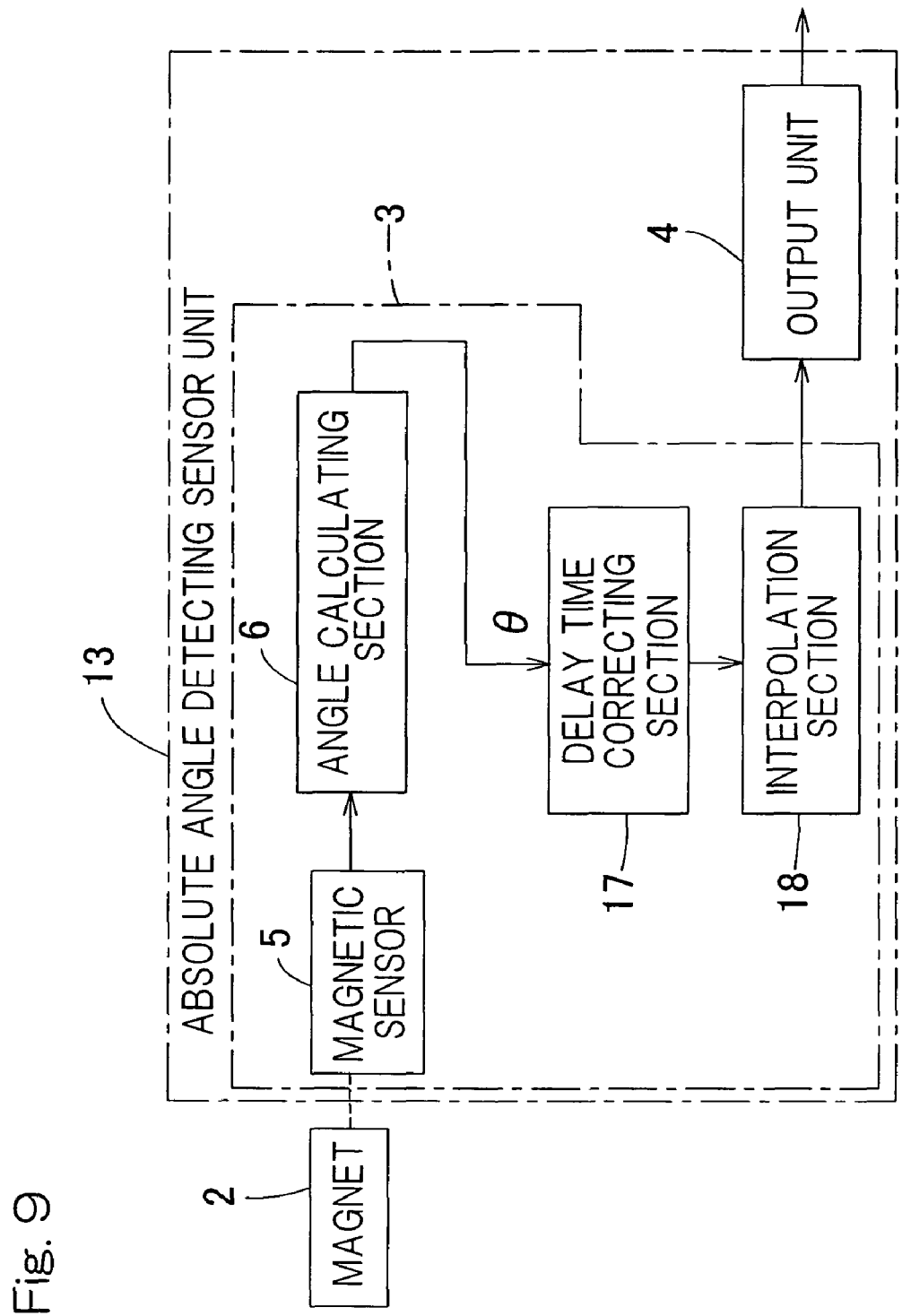
FIG. 9 is a block diagram showing a schematic construction of the rotation detecting device.

In FIG. 9, the delay time correcting section 17 corrects the detected angle $\theta$ outputted from the angle calculating section 6, by a quantity corresponding to the delay time referred to above. The correcting process thereof takes place in the following procedures.

(1) The difference $\Delta\theta n$ (=$\theta n - \theta n-1$) between the detected angle $\theta n$, which is outputted from the angle calculating section 6 at the timing tn, and the detected angle $\theta n-1$, which is outputted from the angle calculating section 6 at the timing tn−1, is calculated as a rotational speed. This difference $\Delta\theta n$ represents an angle over which the rotation takes place during a single magnetic field sampling interval T.

(2) Using the rotational speed (the difference $\Delta\theta n$) so detected as hereinabove described, the rotational angle position Pn+1, which is to be reached at the subsequent sampling timing (the timing at which the angle calculating section 6 outputs the detected angle $\theta n+1$) tn+1, is calculated. Here, the delay time occurring up until the detected angle output is compensated for. As a method of calculating such compensation, if a primary approximation, for example, is used, the rotational angle position Pn+1 to be reached at the timing tn+1 is expressed as follows:

$$Pn+1 = \theta n + \alpha \cdot \Delta\theta n \quad (2)$$

where $\alpha$ represents a constant for compensating the delay time, which is determined depending on the magnitude of the delay time and is set shown to $\alpha = 2$ in the instance shown in FIG. 10. The next expected detected angle Pn+1 so determined in the manner described above constitutes a target value. When the delay time compensation is carried out in this way, Pn+1 represents the position shown in FIG. 10 and the value approaching the actual rotational angle position constitutes the target value. At this time, the previously calculated target value Pn is stored in a memory not shown.

The interpolation section 18 interpolates the sampling interval T for the magnetic fields to thereby calculate the amount of change of the rotational angle. The interpolating process takes place in the following procedures:

(1) Using the target value Pn+1 determined by the delay time correcting section 17 and the previous target value Pn stored in the memory, the amount of count Cn to be changed before the next sampling timing tn+1 is determined as follows:

$$Cn = Pn+1 - Pn \tag{3}$$

(2) After the calculation of the count amount Cn referred to above, the current position A is re-stored as Pn in the memory. Then, clocks, the number of which is equal to Cn, are sequentially inputted to a counter not shown and this causes the count value to change, resulting in a corrected angle output (the delay time compensation+ the interpolation) A.

The process taking place in the output unit 4 is similar to that shown in and described in connection with the embodiment of FIG. 1 and, therefore, the details thereof are not reiterated for the sake of brevity.

Since in the rotation detecting device 1 in this case, the detected angle θ outputted from the angle calculating section 6 is corrected by the delay time correcting section 17 for the delay in time subsequent to the detection of the magnetic fields of the magnet 2 by the magnetic sensor elements 5*a* and prior to the outputting of the detected angle θ from the angle calculating section 6, the absolute angle information outputted from the absolute angle detecting sensor unit 3 can assume a value extremely approximate to the actual rotation angle of the rotating member (the rotary shaft 10) and, thus, the accurate angle information can be obtained in real time.

Also, since the amount of change of the rotational angle is calculated by the interpolation section 18 by interpolating the sampling interval T of the magnetic fields, the high speed operation of the rotating member (the rotary shaft 10) can be detected more finely than the sampling time interval T.

Also, since in the rotation detector equipped bearing assembly 20 shown in FIG. 4, the above described rotation detecting device 1 is incorporated in the rolling bearing assembly 20, the number of component parts used in the bearing utilizing machine and the number of assembling steps can be reduced and downsizing can also be achieved.

What is claimed is:

1. A rotation detecting device, comprising:
   an absolute angle detecting sensor unit to detect a rotation angle of a rotating member in the form of the absolute angle;
   a rotation pulse signal generating section to generate a rotation pulse signal including an index signal that corresponds to a zero phase of the absolute angle detecting sensor unit under a normal condition and a pulse signal of a constant interval, based on the absolute angle detected by the absolute angle detecting sensor unit; and
   an absolute angle output mode executing section to output the rotation pulse signal in an absolute angle output mode, under which mode the rotation pulse signal is outputted from the time the index signal has been outputted to the current absolute angle,
   wherein under the absolute angle output mode the index signal is outputted in response to a request signal from a receiving side circuit, regardless of the zero phase of the absolute angle detecting sensor unit.

2. The rotation detecting device as claimed in claim 1, wherein the rotation pulse signal is made up of two pulse signals having an A phase and a B phase, respectively, which are offset 90° from each other, and the index signal.

3. The rotation detecting device as claimed in claim 1, wherein the absolute angle output mode executing section is capable of executing the outputting under the absolute angle output mode immediately after the absolute angle detecting sensor unit has been electrically powered on and, also, in response to a request signal supplied from outside to this rotation detecting device.

4. The rotation detecting device as claimed in claim 1, further comprising a mode execution signal generating section to output a signal indicative of execution of the absolute angle output mode performed by the absolute angle output mode executing section.

5. The rotation detecting device as claimed in claim 1, wherein the absolute angle detecting sensor unit is capable of detecting magnetic fields emanating from a magnetism generating element provided in the rotating member.

6. The rotation detecting device as claimed in claim 1, wherein the rotation pulse signal generating section and the absolute angle output mode executing section are in the form of circuits integrated on the same semiconductor.

7. A rotation detector equipped bearing assembly comprising:
   an outer ring;
   an inner ring;
   rolling elements interposed between respective raceways of the inner ring and the outer ring;
   a rotating member inserted in the inner ring;
   a rotation detecting device comprising
      an absolute angle detecting sensor unit to detect a rotation angle of a rotating member in the form of the absolute angle;
      a rotation pulse signal generating section to generate a rotation pulse signal including an index signal that corresponds to a zero phase of the absolute angle detecting sensor unit under a normal condition and a pulse signal of a constant interval, based on the absolute angle detected by the absolute angle detecting sensor unit; and
      an absolute angle output mode executing section to output the rotation pulse signal in an absolute angle output mode, under which mode the rotation pulse signal is outputted from the time the index signal has been outputted to the current absolute angle,
   wherein under the absolute angle output mode the index signal is outputted in response to a request signal from a receiving side circuit, regardless of the zero phase of the absolute angle detecting sensor unit.

* * * * *